United States Patent [19]

Dunstan, Jr.

[11] 4,256,504

[45] Mar. 17, 1981

[54] FLY ASH-BASED CEMENT

[75] Inventor: Edwin R. Dunstan, Jr., Lakewood, Colo.

[73] Assignee: The United States of America as represented by the Secretary of the Interior, Washington, D.C.

[21] Appl. No.: 85,452

[22] Filed: Oct. 16, 1979

[51] Int. Cl.$^3$ ............................................. C04B 11/10
[52] U.S. Cl. .................................... 106/109; 106/110; 106/DIG. 1
[58] Field of Search .................. 106/109, DIG. 1, 110

[56] References Cited

U.S. PATENT DOCUMENTS

| | | | |
|---|---|---|---|
| 2,803,556 | 8/1957 | Carlsson et al. | 106/109 |
| 3,854,968 | 12/1974 | Minnick et al. | 106/DIG. 1 |

*Primary Examiner*—James Poer
*Attorney, Agent, or Firm*—William S. Brown; Donald A. Gardiner

[57] ABSTRACT

A cement composition comprising a high calcium-content fly ash and calcium sulfate, and mortar and concrete compositions containing the cement.

5 Claims, No Drawings

FLY ASH-BASED CEMENT

Fly ash, the residue collected in the flues of coal-burning powerplants, has been used as a component of concrete admixtures to replace a portion e.g., about 10 to 25 percent, of the conventionally-employed Portland cement. This combination of fly ash and Portland cement affords a substantial reduction in cost since the fly ash costs much less than Portland cement. Furthermore, Portland cement production requires large amounts of energy and, consequently, use of fly ash reduces energy demand.

It has now been found, according to the present invention, that a cement comprising a high calcium-content fly ash and calcium sulfate has similar advantages, but to a much greater degree since all of the Portland cement is replaced with much less expensive materials, and the energy required to produce the compositions of the invention is minimal.

Fly ash is the residue of powdered coal burned in powerplants at temperatures generally in excess of 2500° F. The chemical makeup of this residue is a function of the coal burned by the powerplant. In particular, the amount of calcium bound in glass particles in the fly ash varies over a wide range. It has been found, as one aspect of the present invention, that a calcium content in excess of about 20 percent, and preferably in excess of 26 percent, by weight of the fly ash is essential to achievement of the necessary compressive strength to permit total replacement of Portland cement. Calcium content of the fly ash is readily determined by conventional means such as that outlined in ASTM designation C114, "Chemical Analysis of Hydraulic Cement", with the results usually being reported as percent CaO.

The calcium sulfate, which constitutes the other essential ingredient of the cement composition of the invention, may be of many forms, but is preferably anhydrous or in the form of the hemihydrate, i.e., $CaSO_4 \cdot \frac{1}{2}H_2O$ (plaster of paris). It may consist of anhydrite, a naturally occurring $CaSO_4$, or it may be prepared by dehydration of hydrated calcium sulfate such as gypsum. Optimum amounts of the calcium sulfate will depend on the specific fly ash and calcium sulfate employed. Suitable amounts, however, will generally range from about 5 to 15 percent by weight.

Since the setting of this cement composition, i.e., the combination of high-calcium fly ash and calcium sulfate, is too fast for most applications, it will usually be necessary to add a retarder as a third ingredient of the composition. Materials suitable for this purpose are those conventionally employed for retarding the set of conventional cements such as Portland cements. One such retarder is Daratard 17, a sodium salt of lignosulfonic acid produced by W. R. Grace & Company. Suitable amounts of the retarder will generally be considerably, e.g. 3 to 4 times, greater than that employed with conventional cements. A range of about 9 to 12 fluid ozs. per hundred pounds of cement is usually satisfactory. Another good retarder is sodium citrate, a granular material, which is used in amounts of about 0.05 to 0.3 percent by weight of the cement. Liquid retarders are generally added with the water in subsequent use of the cement, while granular retarders are preferably admixed with the calcium sulfate prior to addition of water.

The cement composition of the invention is prepared by thorough admixing of the fly ash and calcium sulfate, in finely divided form, by conventional means. Since the fly ash normally occurs in finely divided form, most often collected electrostatically as a dust, further reduction is usually not necessary. The calcium sulfate is generally available in powder form suitable for admixture with the fly ash. Particle size of the calcium sulfate should be similar to that of Portland cement. Mortar or concrete compositions may be prepared from the cement of the invention by addition of conventional materials, i.e., sand or a combination of sand and an aggregate such as gravel, broken stones, pebbles, cinders, etc. These materials, and their amounts, are essentially the same as those employed with other cements, such as Portland cements, and are well known to those versed in the art.

Use of the cement and corresponding mortar and concrete compositions of the invention are also conventional and consist simply of addition and admixture of water in an amount sufficient to form a paste. The amount of water required is, however, generally considerably less than that required for Portland cement concretes. Time required for the resulting admixture to set up and harden will depend on the temperature, amount and type of retarder, handling, etc. Generally, however, set times will vary from about 15 minutes to 2 hours.

The invention will be more specifically illustrated by the following example.

EXAMPLE

A mortar was prepared by admixing 675 grams of a fly ash from Commanche Powerplant, Pueblo, Colo., containing 32 percent calcium, with 75 grams of finely divided anhydrous calcium sulfate. The latter was prepared by dehydration of technical grade $CaSO_4 \cdot 2H_2O$ at 200° C. 302 grams of water, 3.4 cc of Daratard 17, and 2062 grams of silica sand graded according to ASTM designation C109 were added and thoroughly mixed with the cement to form a mortar which was then formed into 2- by 2-inch cubes according to the ASTM procedure. Compressive strengths of the cubes were then measured according to the procedure of the ASTM procedure. Compressive strength at 28 days, the most common referenced strength, was 5770 lb/in$^2$.

By comparison, cubes of Type II Portland cement mortar prepared and tested in the same manner showed a compressive strength of 5540 lb/in$^2$, while a mortar consisting entirely of fly ash and sand, similarly prepared and tested, showed a compressive strength of 3970 lb/in$^2$.

I claim:

1. A cement composition consisting essentially of (1) a major proportion of a fly ash having a calcium content greater than about 20 percent by weight and (2) about 5 to 15 percent by weight of calcium sulfate.

2. The composition of claim 1 in which the calcium sulfate is anhydrous.

3. The composition of claim 2 in which the calcium sulfate is anhydrite.

4. A mortar composition comprising a major proportion of sand and a minor proportion of the cement composition of claim 1.

5. The concrete composition comprising a major proportion of sand and an aggregate and a minor proportion of the cement composition of claim 1.

* * * * *